US008164647B2

(12) United States Patent
Hashimoto et al.

(10) Patent No.: US 8,164,647 B2
(45) Date of Patent: Apr. 24, 2012

(54) IMAGE PICKUP APPARATUS AND ITS LIGHT SOURCE ESTIMATING APPARATUS

(75) Inventors: Yasunari Hashimoto, Kanagawa (JP); Mitsuharu Ohki, Tokyo (JP)

(73) Assignee: Sony Corporation, Tokyo (JP)

( * ) Notice: Subject to any disclaimer, the term of this patent is extended or adjusted under 35 U.S.C. 154(b) by 509 days.

(21) Appl. No.: 11/730,364

(22) Filed: Mar. 30, 2007

(65) Prior Publication Data

US 2007/0236715 A1  Oct. 11, 2007

(30) Foreign Application Priority Data

Apr. 3, 2006  (JP) .................................. 2006-102267
Apr. 28, 2006  (JP) .................................. 2006-124720

(51) Int. Cl.
*G06K 9/00*  (2006.01)
*H04N 17/00*  (2006.01)

(52) U.S. Cl. ................... 348/223.1; 348/222.1; 382/167
(58) Field of Classification Search .................. 348/180, 348/362, 363, 366, 370, 371, 223.1; 356/213, 356/218, 221
See application file for complete search history.

(56) References Cited

U.S. PATENT DOCUMENTS

| 5,966,175 | A  | * | 10/1999 | Inoue ............................. 348/364 |
| 6,952,225 | B1 |   | 10/2005 | Hyodo et al. |
| 2004/0095478 | A1 |  | 5/2004 | Takano et al. |
| 2004/0119977 | A1 | * | 6/2004 | Takahashi et al. ............ 356/406 |
| 2005/0212956 | A1 | * | 9/2005 | Liao et al. ..................... 348/366 |
| 2005/0243186 | A1 | * | 11/2005 | Hayaishi .................... 348/223.1 |
| 2008/0249650 | A1 | * | 10/2008 | Allen et al. ................... 700/121 |

FOREIGN PATENT DOCUMENTS

| EP | 1 583 371 | 10/2005 |
| JP | 3-16494 | 1/1991 |
| JP | 11-283025 | 10/1999 |
| JP | 2000-224608 | 8/2000 |
| JP | 2004-165932 | 6/2004 |
| JP | 2005-190473 | 7/2005 |

OTHER PUBLICATIONS

Pascale, Danny. "A Review of RGB Color Spaces from xyY to R'G'B'" Babelcolor. p. 15. Oct. 6, 2003.*
Harvatek. "Harvatek Surface Mount LED Data Sheet HT-P178 Series." p. 13. Jun. 1, 2006.*
European Search Report for Application No. 072514664-1241/1843603, dated Jan. 22, 2009, 7 pages.
Office Action received from the Japanese Patent Office for corresponding Japanese Patent Application No. 2006-124720, dated Jun. 7, 2011.

* cited by examiner

*Primary Examiner* — David Ometz
*Assistant Examiner* — Dwight C Tejano
(74) *Attorney, Agent, or Firm* — Finnegan, Henderson, Farabow, Garrett & Dunner, L.L.P.

(57) ABSTRACT

A light source estimating apparatus for estimating a type of a light source used when an input image was picked up, the apparatus including: distribution retaining means which retains a distribution, in a predetermined space, of pixel data picked up under a first or second light source; coordinate determining means which determines coordinates of the pixel data of the input image in the predetermined space; and distribution judging means which judges distribution of the pixel data picked up under the first or second light source to which the coordinates belong.

20 Claims, 9 Drawing Sheets

FIG. 2A

| R | G | R | G |
|---|---|---|---|
| G | B | G | B |
| R | G | R | G |
| G | B | G | B |

FIG. 2B

| R | E | R | E |
|---|---|---|---|
| G | B | G | B |
| R | E | R | E |
| G | B | G | B |

FIG. 7A

| | | | |
|---|---|---|---|
| L1: | $g_r$ | $g_g$ | $g_b$ |
| L2: | $g_r$ | $g_g$ | $g_b$ |
| L3: | $g_r$ | $g_g$ | $g_b$ |
| L4: | $g_r$ | $g_g$ | $g_b$ |

FIG. 7B

| | | | | |
|---|---|---|---|---|
| L1: | $M_{11}$ | $M_{12}$ | ..... | $M_{33}$ |
| L2: | $M_{11}$ | $M_{12}$ | ..... | $M_{33}$ |
| L3: | $M_{11}$ | $M_{12}$ | ..... | $M_{33}$ |
| L4: | $M_{11}$ | $M_{12}$ | ..... | $M_{33}$ |

IMAGE PICKUP APPARATUS AND ITS LIGHT SOURCE ESTIMATING APPARATUS

BACKGROUND OF THE INVENTION

1. Field of the Invention

The present invention relates to an image pickup apparatus, particularly an image pickup apparatus having a function of estimating the type of a light source when an input image is picked up, a method of estimating a light source, and a program for making a computer execute the method.

2. Description of Related Art

Human eyes have a function called chromatic adaptation of recognizing a white object to be white even if a light source changes. With this function, human beings can recognize a white object to be white although a spectral distribution of a light source changes with a sun altitude. Similarly, even under a fluorescent lamp having quite a different spectral distribution from that of sun light, a white object can be recognized as white because of the chromatic adaptation function. This function to be realized in an apparatus is a "white balance function".

Even if a white object can be seen as white with the white balance function, color actually seen cannot be reproduced in some cases because of the influences of an "image sensor spectral sensitivity" and a "human eye spectral sensitivity". A "color reproduction function" is prepared as a function of correcting color reproduction. Since parameters of the "white balance function" and "color reproduction function" are expressed by matrices, respectively, one process by one matrix is mounted at some actual stages.

In order to realize the white balance function, a comprehensive control algorithm has been used generally which adopts the Evans principle (gray world assumption) as the base in combination with black body radiation locus information. The Evans principle is an assumption that colors of objects in the world added together are achromatic. The black body radiation locus is a locus of color changing from red copper, red, orange, yellow, green and blue, to be irradiated when a perfect black body is heated. Generally the black body radiation locus is used as the criterion when color information of natural light is processed, because the natural light rides on this black body radiation locus.

However, the Evans principle may not be satisfied under a condition that even if all effective pixels in a screen are integrated, color is not achromatic, such as a scene whose whole screen shows the sky and a scene surrounded by trees. For example, if the scene whose whole screen shows the sky is controlled on the assumption that the Evans principle is satisfied, a color failure occurs in which blue of the sky becomes achromatic (gray) and clouds become yellowish. In order to avoid this, in an actual camera control, it has been proposed that only pixel values presumed achromatic are selectively extracted from effective pixels in the screen and integrated to obtain an evaluation value to be used for white balance control (for example, refer to FIG. 1 in Japanese Patent Application Publication No. HEI-3-16494).

A method of improving a precision of white balance control and color reproduction control has also been proposed in which an image picked up with an image sensor in a camera is used to synthetically evaluate brightness information, an integrated value of pixel values presumed achromatic, an integrated value of the whole screen to estimate the light source (for example, refer to FIG. 1 in Japanese Patent Application Publication No. 2000-224608).

SUMMARY OF THE INVENTION

However, even if only the pixel values presumed achromatic are selectively extracted for white balance control, there is a possibility of a color failure occurrence because it is difficult to distinguish between image pickup under a fluorescent lamp and image pickup in the outdoor surrounded by trees.

Further, with the method of estimating a light source at a position of a picked up image in the evaluation space, since many observation values of a light emitting diode (LED) of an yttrium-aluminum-garnet (YAG) type and day light are duplicated, it is very difficult to distinguish between these two light sources and reproduce natural color. Furthermore, even if image pickup is performed under different light sources, there is a image pickup condition having the same RGB signal ratio of integration results if conditions are matched, which may induce a color failure.

In view of the above, the present invention is made to realize high precision light source estimation and supply proper parameters of a white balance process and a color reproduction process.

According to one aspect of the present invention, there is provided a light source estimating apparatus for estimating a type of a light source used when an input image was picked up. The apparatus includes distribution retaining means; coordinate determining means; and distribution judging means. The distribution retaining means retains a distribution, in a predetermined space, of pixel data picked up under a first or second light source. The coordinate determining means determines coordinates of the pixel data of the input image in the predetermined space. The distribution judging means judges whether the coordinates belong to which distribution of the pixel data picked up under the first or second light source. It is therefore possible to estimate whether the coordinates in the predetermined space of the pixel data of the input image belong to which distribution of the pixel data picked up under the first or second light source, in accordance with the distribution in the predetermined space of the pixel data picked up under the first or second light source.

In the first aspect, the space may be a one-dimensional space, and the distribution is a distribution obtained by projecting the pixel data on the one-dimensional space. A light source can therefore be estimated easily by projecting the pixel data in a multi-dimensional space on a one-dimensional space.

In the first aspect, the image pickup apparatus may further include majority decision means for estimating a light source through majority decision of judgment results on which distribution of the pixel data picked up under the first or second light source the coordinates of a plurality of pixel data of the input image belong to. A light source can therefore be estimated at a higher precision in accordance with a plurality of pixel data of the input image.

In the first aspect, the first light source may include an LED. The type of a light source including LED can be estimated by making the distribution retaining means retain a distribution of pixel data picked up under LED and making the distribution judging means judge whether the pixels belong to the pixel data picked up under LED.

In the first aspect, the first light source may be any one of a plurality of types of light sources, and the second light source may be any one of the plurality of types of light sources not corresponding to the first light source. Namely, a light source is estimated through comparison of different two of a plurality of types of light sources. In this case, the plurality of types of light sources may include LED. The first light source may be one of four types of light sources including sun light, a fluorescent lamp, an incandescent lamp and an LED, and the second light source may be one of the four types of light sources but not the first light source.

In the first aspect, the first light source may be one of a plurality of types of light sources, and the second light source may be a plurality of types of other light sources than the first light source of the plurality of types of light sources. Namely, a light source is estimated through comparison between a specific type of the plurality of types of light sources and other types of the light sources than the specific type. In this case, the plurality of types of light sources may include LED. The first light source may be one of four types of light sources including sun light, a fluorescent lamp, an incandescent lamp and an LED, and the second light source may include other three types of the plurality of types of light sources than the first light source.

According to a second aspect of the present invention, there is provided a light source estimating apparatus for estimating a type of a light source used when an input image was picked up. The apparatus includes image pickup means; distribution retaining means; coordinate determining means; white balance processing means; and color reproduction processing means. The image pickup means picks up an input image. The distribution retaining means retains a distribution, in a predetermined space, of pixel data picked up under a first or second light source. The coordinate determining means determines coordinates of the pixel data of the input image in the predetermined space. The distribution judging means judges which distribution of the pixel data picked up under the first or second light source the coordinates belong to. The white balance processing means performs a white balance process of the input image in accordance with a judgment result. The color reproduction processing means performs a color reproduction process of an output of the white balance process in accordance with the judgment result. Accordingly, it is estimated what distribution of the pixel image picked up under the first or second light source the coordinates in the predetermined space of the pixel data of the input image belong to, in accordance with the distribution, in the predetermined space, of the pixel image picked up under the first or second light source. In accordance with the estimated light source, the white balance process and color reproduction process are executed.

In the second aspect, the image pickup apparatus may further include light source limiting means which limits the first light source to a specific type of a light source and makes the distribution judging means conduct the judgment. This arrangement brings an effect of improving a precision of light source estimation. In this case, the image pickup apparatus may further include electronic flash emission light detecting means which detect whether electronic flash light emission was effected when the input image was picked up. The light source limiting means makes the distribution judging means to conduct the judgment, in accordance with a detection result of the electronic flash light emission. In cooperation with the electronic flash switch, the accuracy of the light source estimation can be improved.

In the second aspect, the first light source may be one of a plurality of types of light sources, and the second light source may be another type of the plurality of types of light sources not corresponding to the first light source. In this case, the image pickup apparatus may further include light source limiting means which limits the plurality of types of light sources to a specific type of a light source and makes the distribution judging means conduct the judgment. The light source limiting means may limit the plurality of types of light sources to a fluorescent lamp and an LED and may make the distribution judging means conduct the judgment. Since the light source is limited in advance, an accuracy of light source estimation can be improved.

In the second aspect, the white balance processing means may utilize white balance gains of sun light in a case where the judgment results indicates that the light source is an LED. Even if the light source is an LED, similar processing to that of sun light can be performed.

According to a third aspect of the present invention, there is provided a light source estimating method for a light source estimating apparatus provided with distribution retaining means which retains a distribution, in a predetermined space, of pixel data picked up under a first or second light source and estimating a type of a light source used when an input image was picked up. The method includes steps of: determining coordinates in the space of the pixel data of the input image; and judging which distribution of the pixel data picked up in the first or second light source the coordinates belong to, and a program for making a computer execute these steps. It is therefore possible to estimate which distribution of the pixel data picked up under the first or second light source the coordinates in the predetermined space of the pixel data of the input image belong to, in accordance with the distribution of the pixel data picked up under the first or second light source.

BRIEF DESCRIPTION OF THE DRAWINGS

FIGS. 2A and 2B are diagrams showing configuration examples of image sensors.

FIGS. 7A and 7B are diagrams showing an example of a lookup table storing white balance gains and color correction matrices.

DESCRIPTION OF THE EMBODIMENTS

Embodiments of the present invention will now be described in detail with reference to the accompanying drawings.

Figure 1:
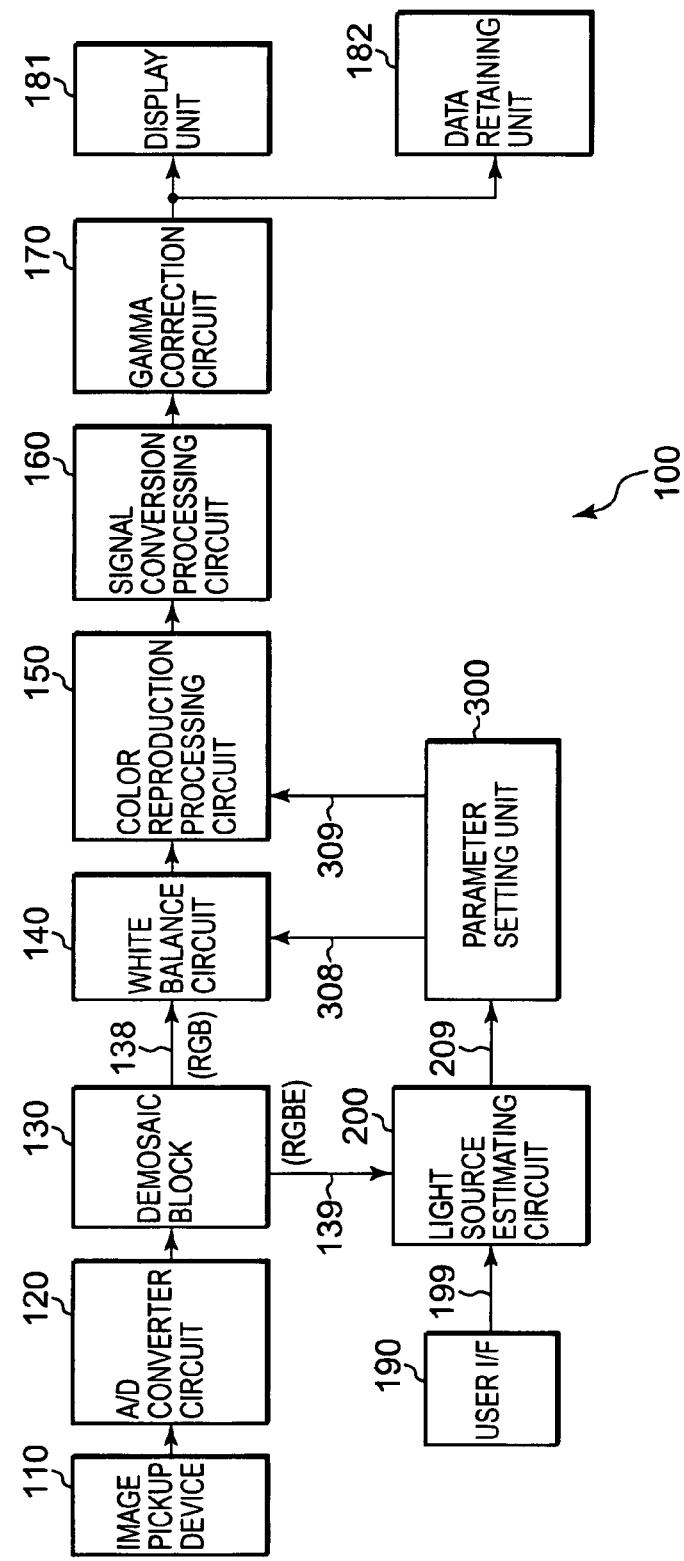
FIG. 1 is a diagram showing an example of the structure of an image pickup apparatus according to an embodiment of the present invention.

FIG. 1 is a diagram showing an example of the structure of an image pickup apparatus 100 according to an embodiment of the present invention. The image pickup apparatus 100 is constituted of an image pickup device 110, an analog to digital (A/D) converter circuit 120, a demosaic block 130, a white balance circuit 140, a color reproduction processing circuit 150, a signal conversion processing circuit 160, a gamma correction circuit 170, a display unit 181, a data retaining unit 182, a user interface (hereinafter abbreviated to "user I/F") 190, a light source estimating circuit 200 and an image processing parameter setting unit 300.

The image pickup device 110 is a photoelectric conversion device for converting optical information of an input image into an electric signal (voltage value), and is also called an image sensor. For example, a charge coupled device (CCD) or the like is used as the image pickup device 110.

The image pickup device 110 is generally an image sensor having three types of color filters, red (R), green (G) and blue (B) as shown in FIG. 2A. An image sensor has recently been realized in which emerald (E) color filters are added to compensate for a red negative sensitivity peculiar to human eyes, as shown in FIG. 2B. In the embodiments of the present invention, description will be made on the assumption that an image sensor having four types of color filters, emerald added to RGB, is used as the image pickup device 110.

The A/D converter circuit 120 is a circuit for converting an analog signal supplied from the image pickup device 110 into a digital signal. The A/D converter circuit 120 quantizes each pixel of an input image into pixel data of 14 bits.

The demosaic block 130 performs a demosaic process for the pixel data. The demosaic process interpolates the pixel data having one color per one pixel to make one pixel have three colors (RGB) or four colors (RGBE). In the embodiments of the present invention, the demosaic block 130 supplies RGB pixel data to the white balance circuit 140 via a signal line 138, and RGBE pixel data to the light source estimating circuit 200 via a signal line 139.

In accordance with the RGBE pixel data supplied from the demosaic block 130, the light source estimating circuit 200 estimates a light source when an input image was picked up. The structure and process contents of the light source estimating circuit will be later described. An estimation result by the light source estimating circuit 200 is supplied to the image processing parameter setting unit 300 via a signal line 209.

The image processing parameter setting unit 300 sets parameters for image processing in accordance with the light source estimated by the light source estimating circuit 200. Namely, the image processing parameter setting unit 300 supplies a white balance gain to the white balance circuit 140 via a signal line 308, and supplies a color correction matrix matching the light source estimated by the light source estimating circuit 200 to the color reproduction processing circuit 150 via a signal line 309.

The white balance gain is a vertical vector constituted of three gains $g_r$, $g_g$ and $g_b$ corresponding to red, green and blue colors. The color correction matrix is a matrix constituted of 9 elements ($M_{11}$ to $M_{33}$), three elements in a vertical direction and three elements in a horizontal direction.

The image processing parameter setting unit 300 may be realized by a central processing unit (CPU) such as a microprocessor.

The white balance circuit 140 performs a white balance process by multiplying RGB pixel data supplied from the demosaic block 130 by a corresponding gain of the white balance gain supplied from the image processing parameter setting unit 300. Namely, R pixel data is multiplied by an R gain $g_r$, G pixel data is multiplied by a G gain $g_g$, and B pixel data is multiplied by a B gain $g_b$ to obtain new RGB pixel data.

The color reproduction processing circuit 150 multiplies RGB pixel data subjected to the white balance process by the white balance circuit 140 by the color correction matrix supplied from the image processing parameter setting unit 300. With this color reproduction process, the color reproduction processing circuit 150 maps the RGB pixel data on an XYZ space.

The signal conversion processing circuit 160 converts the coordinate values in the XYZ space into YCC values, i.e., a brightness Y, a blue color difference Cb and a red color difference Cr. The gamma correction circuit 170 performs a gamma correction in accordance with gamma values of the display unit 181 and the like.

The display unit 181 is a display such as a liquid crystal display (LCD) and displays an input image supplied from the gamma correction circuit 170 on a display monitor while the shutter release button is not depressed. The data retaining unit 182 is a recording medium and stores the input image supplied from the gamma correction circuit 170 if the shutter release button is depressed.

The user I/F 190 is hardware switches mounted on the image pickup apparatus 100 or a software graphical user interface (GUI). The shutter release button is one of the user I/F 190. Other user interfaces may be a light source setting switch for performing light source estimation by limiting a light source to a specific type, an electronic flash switch for designating presence/absence of an electronic flash operation, and other switches. Contents designated by the user I/F 190 are supplied to the light source estimating circuit 200 via a signal line 199.

Figure 3:
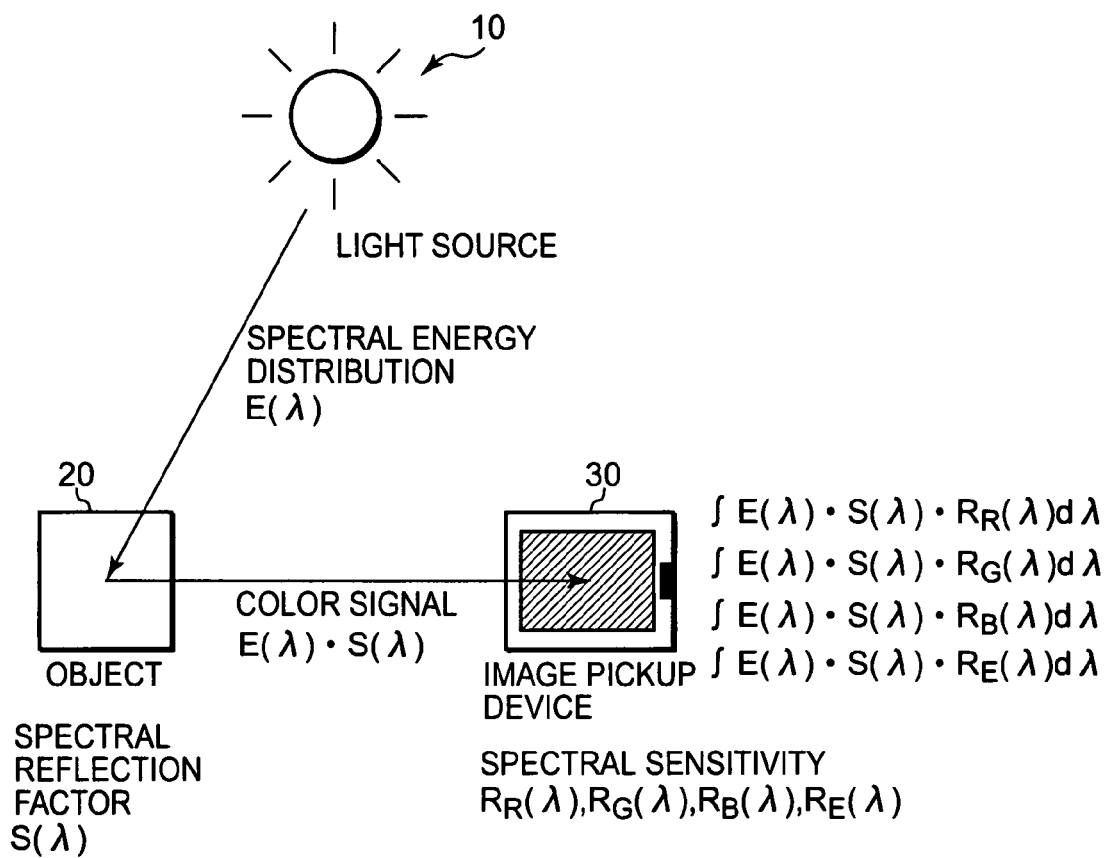
FIG. 3 is a diagram showing a color image generating model.

FIG. 3 is a diagram showing a color image generation model. Description will be made on a flow of light irradiated from a light source 10 and reflected by the surface of an object 20 and received by an image pickup device 30. $\lambda$ is a symbol representative of a wavelength.

Light irradiated from the light source 10 is represented by a spectral energy distribution $E(\lambda)$ as radiation energy (relative value) at each wavelength. Light irradiated from the light source 10 is absorbed in or reflected from the surface layer of the object 20. A spectral reflection factor $S(\lambda)$ represents a ratio of a reflection light from the object to an incidence light at each wavelength. Therefore, a spectral distribution of a reflection light propagating toward the image pickup device 30 is represented by a product $(E(\lambda) \cdot S(\Pi))$ of the spectral energy distribution $E(\lambda)$ and the spectral reflection factor $S(\Pi)$.

It is assumed herein that reflection at the surface is based only on the diffusion reflection components and that other components such as mirror surface reflection are not considered. In a usual case, the mirror surface reflection components are often very bright, and there is a high possibility that these components become pixels having a high luminance on a picked up image. In the embodiments of the present invention, processing is performed only for the diffusion reflection components by removing beforehand data in a high luminance portion.

Light reflected from the object 20 becomes incident upon the image pickup device 30. A spectral response of the image pickup device 30 is represented by spectral sensitivity functions $R_R(\lambda)$, $R_G(\lambda)$, $R_B(\lambda)$ and $R_E(\lambda)$ of four RGB colors.

Therefore, an output $\rho i(x)$ of an x-th pixel of the image pickup device 30 can be written in the following expression (1):

$$\rho_i(x) = \int E(\lambda) \cdot S(\lambda) \cdot R_i(\lambda) d\lambda \quad (i=R, G, B, E) \qquad (1)$$

This integration is performed for wavelengths in the visual range usually in a section from about 400 nm to about 700 nm.

The pixel output $\rho i(x)$ is therefore determined from the spectral energy distribution $E(\lambda)$ of the light source 10, the spectral reflection factor $S(\lambda)$ of the object 20 and the spectral sensitivity function $Ri(\lambda)$ of the image pickup device 30. The spectral energy distribution $E(\lambda)$ of the light source 10 is dependent upon the light source 10 and is already known. In the embodiments of the present invention, for example, four types of light sources are assumed including {L1, L2, L3, L4}={sun light, fluorescent lamp, incandescent lamp, LED}. The spectral reflection factor $S(\lambda)$ of the object 20 is dependent upon the object 20 and is already known. The spectral sensitivity function has the characteristics of multiplying together the spectral transmittances of color filters used in the image pickup device 30, a spectral sensitivity of the image sensor, and the spectral transmittance of a lens of the image pickup device, and these are already known.

As the object 20, m (m is a positive integer) representative objects are assumed, and pixel data is generated for each of the four types of light sources by the expression (1) above. Namely, the output of the image pickup device 30 for the sun light (light source L1) is a four-dimensional vector having the following elements:

$$\rho_R(j)\_underL1 = \int E_1(\lambda) \cdot S_j(\lambda) \cdot R_R(\lambda) d\lambda$$

$$\rho_G(j)\_underL1 = \int E_1(\lambda) \cdot S_j(\lambda) \cdot R_G(\lambda) d\lambda$$

$$\rho_B(j)\_underL1 = \int E_1(\lambda) \cdot S_j(\lambda) \cdot R_B(\lambda) d\lambda$$

$$\rho_E(j)\_underL1 = \int E_1(\lambda) \cdot S_j(\lambda) \cdot R_E(\lambda) d\lambda (j=1 \sim m) \quad (2)$$

The output of the image pickup device 30 for the fluorescent lamp (light source L2) is a four-dimensional vector having the following elements:

$$\rho_R(j)\_underL2 = \int E_2(\lambda) \cdot S_j(\lambda) \cdot R_R(\lambda) d\lambda$$

$$\rho_G(j)\_underL2 = \int E_2(\lambda) \cdot S_j(\lambda) \cdot R_G(\lambda) d\lambda$$

$$\rho_B(j)\_underL2 = \int E_2(\lambda) \cdot S_j(\lambda) \cdot R_B(\lambda) d\lambda$$

$$\rho_E(j)\_underL2 = \int E_2(\lambda) \cdot S_j(\lambda) \cdot R_E(\lambda) d\lambda (j=1 \sim m) \quad (3)$$

The output of the image pickup device 30 for the incandescent lamp (light source L3) is a four-dimensional vector having the following elements:

$$\rho_R(j)\_underL3 = \int E_3(\lambda) \cdot S_j(\lambda) \cdot R_R(\lambda) d\lambda$$

$$\rho_G(j)\_underL3 = \int E_3(\lambda) \cdot S_j(\lambda) \cdot R_G(\lambda) d\lambda$$

$$\rho_B(j)\_underL3 = \int E_3(\lambda) \cdot S_j(\lambda) \cdot R_B(\lambda) d\lambda$$

$$\rho_E(j)\_underL3 = \int E_3(\lambda) \cdot S_j(\lambda) \cdot R_E(\lambda) d\lambda (j=1 \sim m) \quad (4)$$

The output of the image pickup device 30 for the LED (light source L4) is a four-dimensional vector having the following elements:

$$\rho_R(j)\_underL4 = \int E_4(\lambda) \cdot S_j(\lambda) \cdot R_R(\lambda) d\lambda$$

$$\rho_G(j)\_underL4 = \int E_4(\lambda) \cdot S_j(\lambda) \cdot R_G(\lambda) d\lambda$$

$$\rho_B(j)\_underL4 = \int E_4(\lambda) \cdot S_j(\lambda) \cdot R_B(\lambda) d\lambda$$

$$\rho_E(j)\_underL4 = \int E_4(\lambda) \cdot S_j(\lambda) \cdot R_E(\lambda) d\lambda (j=1 \sim m) \quad (5)$$

Here, "image pickup under light source L1", "image pickup under light source L2", "image pickup under light source L3" and "image pickup under light source L4" are respectively considered as "state". A point in the four-dimensional space represented by the expressions (2) to (5) is considered as an event sample in each state. It can be considered that the m objects are representative objects existing in the world, exist in a sufficient number and are samples without bias. Therefore, the "state", can be distinguished by adopting a linear judgment method.

The representative object spectral reflection factor of each object existing in the world is described in ISO "Spectral database of colors of standard objects for color reproduction evaluation" (ISO/TR 16066:2003). This database can be used for calculations of the expressions (2) to (4).

Figure 4:
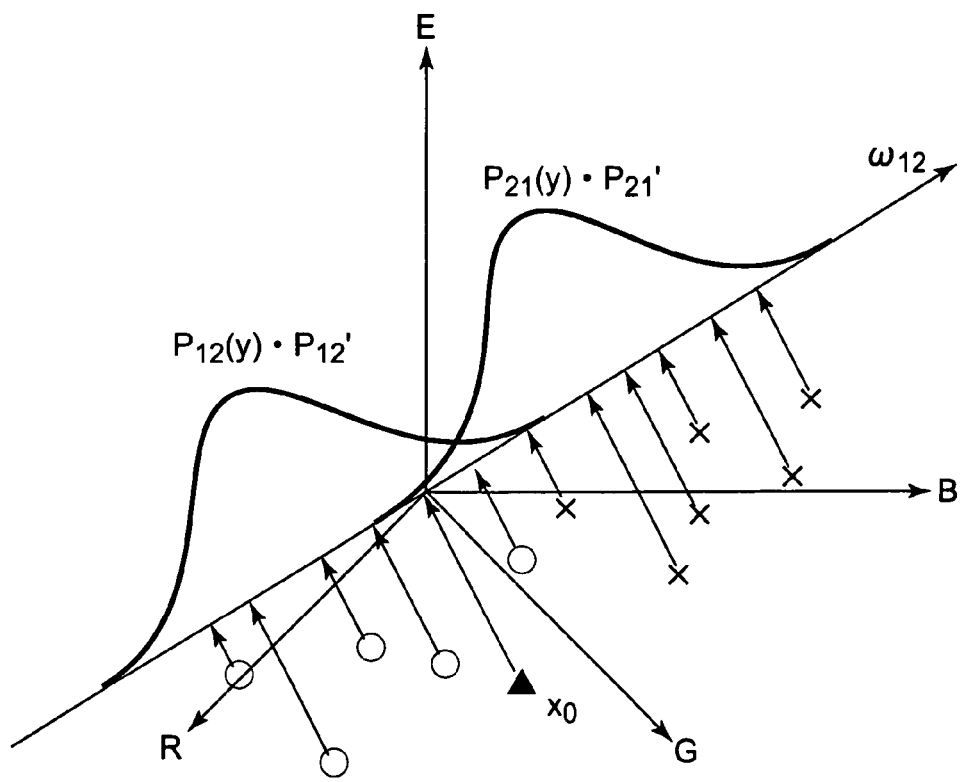
FIG. 4 is a diagram showing an example of light source judgment by a linear judgment method according to an embodiment of the present invention.

FIG. 4 is a diagram showing an example of light source estimation by the linear judgment method according to an embodiment of the present invention. Pixel data of samples in the RGBE space is projected on a one-dimensional $\omega_{12}$ axis to obtain a sample distribution ($P_{12}(y) \cdot P_{12}'$ or $P_{21}(y) \cdot P_{21}'$), and thereafter, pixel data $x_0$ to be judged is projected on the one-dimensional $\omega_{12}$ axis to thereby judge by the linear judgment method whether the pixel data belongs to which distribution.

Description will now made first on the linear judgment method. It is assumed that there are states D1 and D2. It is assumed that a certain event x (represented by a point in the four-dimensional space) occurs in the D1 or D2 state. It is assumed that it is not definite whether the state is D1 or D2. In order to estimate, from the fact that the event x occurred, whether the state is D1 or D2, a super flat plane most suitable for judging the two states is obtained from the distributions of D1 and D2, and the D1 and D2 states are judged on the super flat plane. This is the linear judgment method.

The samples of the event to occur under the condition of the state D1 are represented by $x(1)$ to $x(n_1)$ ($n_1$ in total). The samples of the event to occur under the condition of the state D2 are represented by $x(n_1+1)$ to $x(N)$ ($n_2=N-n_1$ in total). It is assumed that n1, n2 and N are sufficiently large numbers, that $x(1)$ to $x(n_1)$, $x(n_1+1)$ to $x(N)$ are samples without bias, and that a density distribution to occur under each condition is approximated at a sufficient precision.

A sample average $m_i$, a scatter matrix $S_i$ and a between-class scatter matrix $S_W$ are defined as in the following:

$$m_i = \frac{1}{n_i} \sum_{x \in D_i} x \quad (i=1,2)$$

$$S_i = \sum_{x \in D_i} (x - m_i)(x - m_i)^t \quad (i=1,2)$$

$$S_W = S_1 + S_2$$

Namely, the scatter matrix $S_i$ is defined by a square sum of a difference between a feature vector x belonging to a class i and a class average $m_i$. The symbol t indicates vector transposition.

The one-dimensional axis $\omega$ to be projected is given by the following expression (6):

$$\omega = S_W^{-1}(m_1 - m_2) \quad (6)$$

The following expression is satisfied:

$$y(j) = \omega^t x(j) \quad (7)$$

where $y(j)$ is a point of each sample $x(j)$ (j=1 to N) projected on this axis $\omega$.

Here, $x(j)$ and $\omega$ are both the vertical vector constituted of four elements, and $y(j)$ is a scalar quantity. It can be said from the expression (7) that $y(1)$ to $y(n_1)$ are samples of an event (point in the one-dimensional space) occurring under the condition of the state D1 and that $y(n_1+1)$ to $y(N)$ are samples of an event (point in the one-dimensional space=scalar quantity) occurring under the condition of the state D2.

It is assumed that an event $x_0$ can be observed thereafter in the D1 or D2 state. In this case, the following expression (8) is calculated by using $\omega$ obtained by the expression (6):

$$y_0 = \omega^t x_0 \quad (8)$$

If $y_0$ in the expression (8) satisfies the expression (9):

$$P(D1|y_0) >> P(D2|y_0) \quad (9)$$

it is judged that the state was D1, whereas if $y_0$ satisfies the expression (10):

$$P(D1|y_0) << P(D2|y_0) \qquad (10)$$

it is judged that the state was D2. In other cases, it is judged that the state was not able to be judged.

Namely, it is judged on the basis of "a magnitude relation between a conditional probability P (D1|$y_0$) assuming that the event $y_0$ occurs under the condition of the state D1 and a conditional probability P (D2|$y_0$) assuming that the event $y_0$ occurs under the condition of the state D2".

Generally, a conditional probability satisfies the following Bayesian formula:

$$P(a|b) \times P(b) = P(b|a) \times P(a)$$

Therefore, the expressions (9) and (10) are transformed into the following expressions (11) and (12):

$$P(y_0|D1)P(D1) >> P(y_0|D2)P(D2) \qquad (11)$$

$$P(y_0|D1)P(D1) << P(y_0|D2)P(D2) \qquad (12)$$

x(1) to x($n_1$) and x($n_1$ +1) to x(N) are sufficient numbers, and samples without bias. Therefore, y(1) to y($n_1$) derived from the expression (5) are samples (in sufficient numbers and without bias) of an event occurring under the condition of the state D1. Y($n_1$+1) to y(N) derived from the expression (7) are samples (in sufficient numbers and without bias) of an event occurring under the condition of the state D2. In this manner, by using sample in sufficient numbers and without bias, "the conditional probability P(y|D1) that y occurs under the condition of the state D1" and "the conditional probability P(y|D2) that y occurs under the condition of the state D2" can be obtained for any desired y. Namely, when considering that P(y|D1) and P(y|D2) as the function of y, it is possible to obtain these two functions.

P(D1) is a ratio of a probability of D1 of the two states D1 and D1, and P(D2) is a ratio of a probability of D2 of the two states D1 and D1. For example, if the two states occur at the equal probability, P(D1)=P(D2)=½. As will be later described, D1 and D2 indicate the type of a light source. Generally, a ratio of image pickup under the sun light is considered large, and a ratio (a ratio of a probability of sun light) P of the sun light may be set large.

Since P(y|D1) and P(y|D2) as the function of y and the value of P(D1)=P(D2) can be obtained, it is possible to judge whether $y_0$ obtained from the expression (8) satisfies the expression (11) or (12). Namely, it is possible to judge whether the state is D1 or D2 or the state cannot be judged.

In defining the expressions (11) and (12), a threshold value (constant) is set, it becomes possible to judge that the expression (11) is satisfied if the value P($y_0$|D1)×P(D1)–P($y_0$|D2)× P(D2) is equal to or larger than the threshold value, and to judge that the formula (12) is satisfied if the value P($y_0$|D2)× P(D2)–P($y_0$|D1)×P(D1) is equal to or larger than the threshold value.

The larger the value P($y_0$|D1)×P(D1)–P($y_0$|D2)×P(D2) from 0, a precision of an estimation result for the state D1 is improved. On the other hand, the smaller the value P($y_0$|D1)× P(D1)–P($y_0$|D2)×P(D2) from 0, a precision of an estimation result for the state D2 is improved.

With reference to FIG. 4, description will be made on an example of applying the above-described linear judgment method to light source judgment. In FIG. 4, a circle symbol represents samples of m pixel data picked up under the light source L1, and a cross symbol represents samples of m-pixel data picked up under the light source L2. Each pixel data is assumed to be the vertical vector constituted of four elements of RGBE. The one-dimensional axis $\omega_{12}$ can be obtained from 2 m samples by using the expression (6). Therefore, this one-dimensional axis $\omega_{12}$ is also the vertical vector constituted of four elements.

A distribution y(j) on the one-dimensional axis $\omega_{12}$ of the m samples picked up under the light source L1 can be obtained from the expression (7). It is assumed that this distribution is P(y|D1) which is $P_{12}(y)$ as a function of y. A distribution y(j) on the one-dimensional axis $\omega_{12}$ of the m samples picked up under the light source L2 can be obtained from the expression (7). It is assumed that this distribution is P(y|D2) which is $P_{21}(y)$ as a function of y. The expression (7) is an inner product calculation of four-dimensional vector and the calculation result is a scalar quantity.

Occurrence probabilities of D1 and D2 are set. It is possible to assume that both have the same probability of P(D1)=P (D2)=½. Generally, since image pickup is often conducted under the sun light, an occurrence probability under the sun light may be set larger. This probability is represented by $P_{12}'$=P(D1), $P_{21}'$=P(D2).

A product of a distribution on the one-dimensional axis $\omega_{12}$ and an occurrence probability are indicated by two graphs $P_{12}(y) \cdot P_{12}'$ and $P21 (y) \cdot P_{21}'$.

As the image data $x_0$ appears on the signal line 139 after the image pickup, the value $y_0$ projected on the one-dimensional axis $\omega$ is obtained by the expression (8). The expression (8) is an inner product calculation of four-dimensional vector and a generated value is a scalar quantity.

It is checked whether this calculated value satisfies the expression (11) or (12). P($y_0$|D1) in the expressions (11) and (12) is $P_{12}(y)$, P($y_0$|D2) is $P_{21}(y)$, P(D1) is $P_{12}'$ and P(D2) is $P_{21}'$.

If the expression (11) is satisfied, it is judged as not "image pickup under light source L2 (fluorescent lamp)" but "image pickup under light source L1 (sun light)". If the expression (12) is satisfied, it is judged as not "image pickup under light source L1 (sun light)" but "image pickup under light source L2 (fluorescent lamp)". If the expression (11) or (12) is not satisfied, it is judged that judgment failed.

Figure 5:
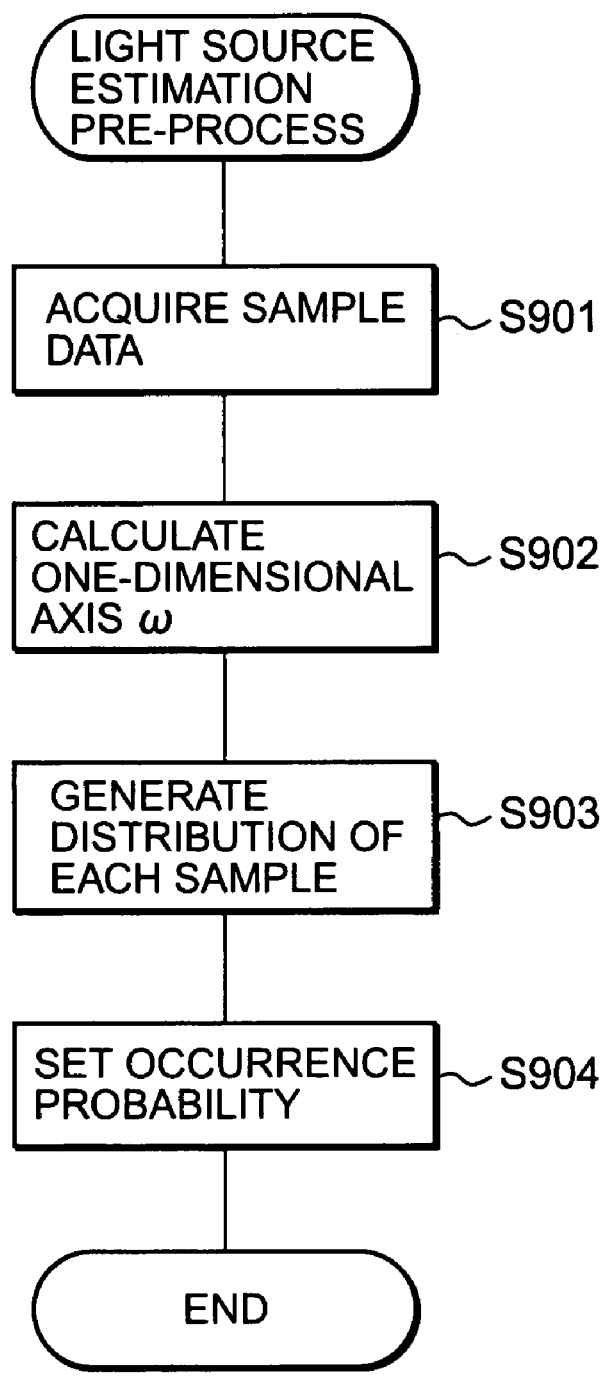
FIG. 5 is a diagram showing an example of a pre-process of light source estimation according to an embodiment of the present invention.

FIG. 5 is a diagram showing an example of a pre-process of light source estimation according to an embodiment of the present invention. Description will be made on the pre-process for judging whether a state is "image pickup (state Dh) under a light source Lh" or "image pickup (state Dk) under a light source Lk", wherein h≠k.

First, acquired as samples of pixel data are m points in the four-dimensional space by expressions corresponding to Lh of the expressions (2) to (5) and m points in the four-dimensional space by expressions corresponding to Lk of the expressions (2) to (5) (Step S901). By using these points as samples, the expression (6) is calculated to calculate the one-dimensional axis $\omega_{hk}$ (Step S902).

The expression (7) is calculated for each sample to generate a distribution of projection on the one-dimensional axis $\omega_{hk}$, for both the picked up data of "image pickup under the light source Lh" and the picked up data of "image pickup under the light source Lk" (Step S903). A distribution of "image pickup under the light source Lh" is P(y|Dh) which is represented by $P_{hk}(Y)$. A distribution of "image pickup under the light source Lk" is P(y|Dk) which is represented by $P_{kh}(y)$.

Occurrence probabilities are set for "image pickup under the light source Lh" and "image pickup under the light source Lk" (Step S904). Assuming that both image pickup occurs at the same probability, P(Dh)=P(Dk)=½, P(Dh) is represented by $P_{hk}'$, and P(Dk) is represented by $P_{kh}'$.

If the present invention is applied, for example, to a digital still camera, this pre-process is conducted beforehand at the time of shipping or the like to allow a speedy process during image pickup.

One-to-one judgment has been described between "image pickup (state Dh) under the light source Lh" and "image pickup (state Dk) under the light source Lk". One-to-multiple judgment is adopted in the similar manner. Namely, judgment may be conducted between "image pickup (state Dh) under the light source Lh" and "image pickup (state Dk) under the light sources other than the light source Lh".

In this case, the numbers of samples acquired at Step S901 are m samples for the light source Lh and 3 m samples for the light sources other than the light source Lh. The one-dimensional axis calculated at Step S902 by the expression (6) is $\omega_{h0}$. Of the distribution generated at Step S903 by the expression (7), a distribution for the light source Lh is $P_{h0}(y)$ and a distribution for the light sources other than the light source Lh is $P_{0h}(y)$. In this case, in order to distinguish one of the four light sources from the other three light sources, the occurrence probabilities at Step S904 are, for example, P(Dh)=¼ and P(Dk)=¾. P(Dh) is represented by $P_{h0}'$ and P(Dk) is represented by $P_{0h}'$.

Figure 6:
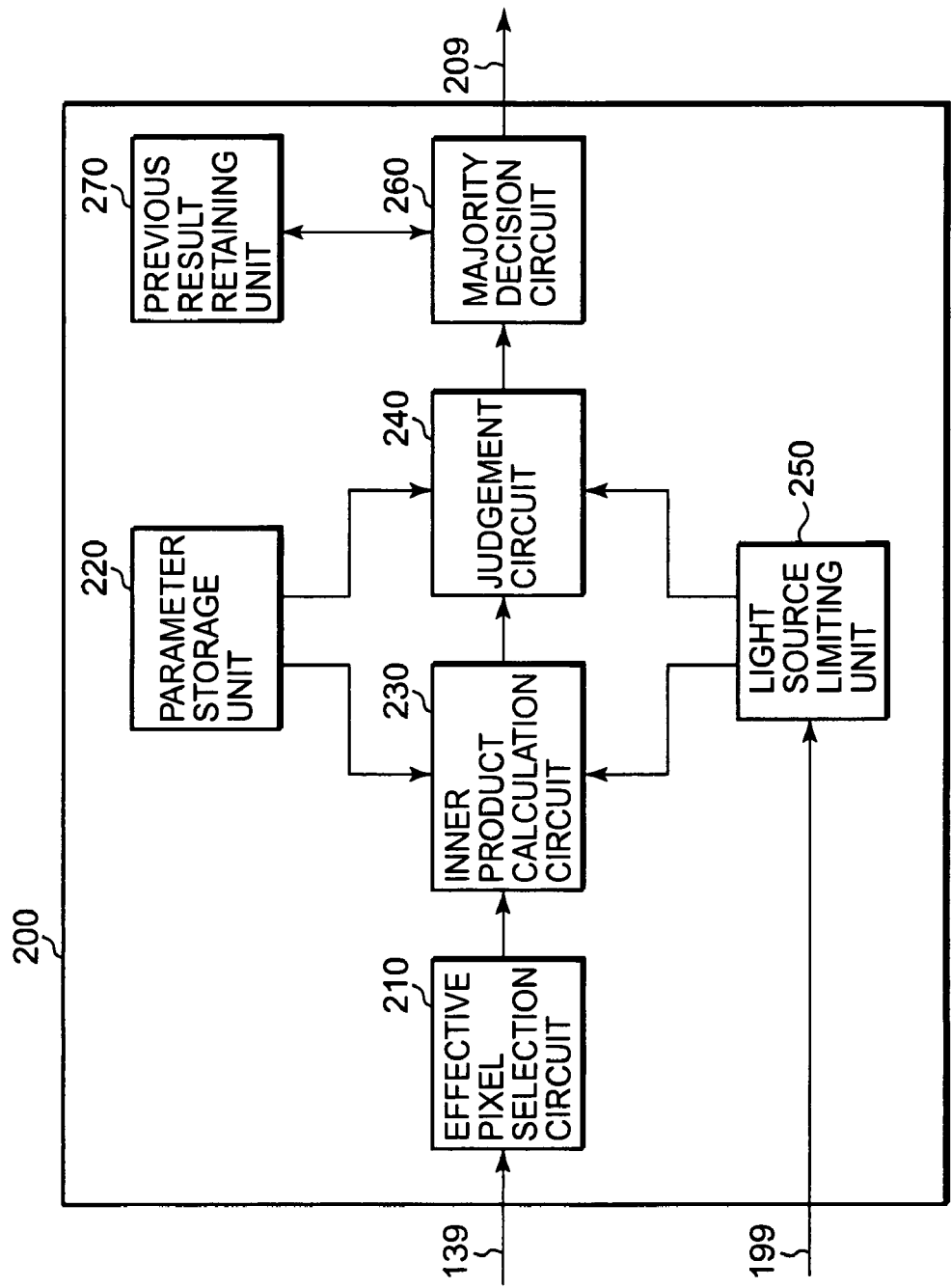
FIG. 6 is a diagram showing an example of the structure of a light source estimation circuit according to an embodiment of the present invention.

FIG. 6 is a diagram showing an example of the structure of the light source estimating circuit 200 according to an embodiment of the present invention. The light source estimating circuit 200 is constituted of an effective pixel selection circuit 210, a light source estimation parameter retaining unit 220, an inner product calculation circuit 230, a judgment circuit 240, a light source limiting unit 250, a majority decision circuit 260 and a previous result retaining unit 270.

The effective pixel selection circuit 210 selects effective pixel data from pixel data of the whole screen supplied from the demosaic block 130 via the signal line 139. Namely, the effective pixel selection circuit 210 removes extremely dark pixel data and extremely bright pixel data. This is because the extremely dark pixels are greatly influenced by noises and should not be used as the judgment target. The extremely bright pixels are influenced by the mirror surface reflection components as described earlier, and pixel data of some of RGBE are often saturated and correct values cannot be obtained. Thus, the extremely bright pixels should not be used as the judgment target. Therefore, the effective pixel selection circuit 210 does not select pixels having the pixel data of zero or near zero and pixels having the pixel data of the maximum value or near the maximum value, and selects only pixel data other than these pixel data.

The light source estimation parameter retaining unit 220 stores parameters necessary for light source estimation. These parameters include the one-dimensional axis ω calculated beforehand by the expression (6), the distribution y(j) generated by the expression (7) and arbitrary set occurrence probabilities.

For example, in order to judge whether the light source is "image pickup (state Dh) under the light source Lh" or "image pickup state (Dk) under the light source Lk" among the four types of light sources, the light source estimation parameter retaining unit 220 stores in advance four-dimensional vectors $\omega_{12}$, $\omega_{13}$, $\omega_{14}$, $\omega_{23}$, $\omega_{24}$ and $\omega_{34}$, y functions $P_{12}(y)$, $P_{21}(y)$, $P_{13}(y)$, $P_{31}(y)$, $P_{14}(y)$, $P_{41}(y)$, $P_{23}(y)$, $P_{32}(y)$, $P_{24}(y)$, $P_{42}(Y)$, $P_{34}(y)$ and $P_{43}(y)$, and scalar values $P_{12}'$, $P_{21}'$, $P_{13}'$, $P_{31}'$, $P_{14}'$, $P_{41}'$, $P_{23}'$, $P_{32}'$, $P_{24}'$, $P_{42}'$, $P_{34}'$ and $P_{43}'$.

For example, in order to judge whether the light source is "image pickup (state Dh) under the light source Lh" or "image pickup state (Dk) under the light sources other than the light source Lh" among the four types of light sources, the light source estimation parameter retaining unit 220 stores in advance four-dimensional vectors $\omega_{10}$, $\omega_{20}$, $\omega_{30}$ and $\omega_{40}$, y functions $P_{10}(y)$, $P_{01}(y)$, $P_{20}(Y)$, $P_{02}(Y)$, $P_{30}(Y)$, $P_{03}(y)$, $P_{40}(y)$, and $P_{04}(y)$, and scalar values $P_{10}'$, $P_{01}'$, $P_{20}'$, $P_{02}'$, $P_{30}'$, $P_{03}'$, $P_{40}'$ and $P04'$.

The inner product calculation circuit 230 performs an inner product calculation by the expression (8) between the pixel data selected by the effective pixel selection circuit 210 and the one-dimensional axis ω retained in the light source estimation parameter retaining unit 220.

For example, in order to judge whether the light source is "image pickup (state Dh) under the light source Lh" or "image pickup state (Dk) under the light source Lk" among the four types of light sources, the inner product calculation circuit reads $\omega_{12}$, $\omega_{13}$, $\omega_{14}$, $\omega_{23}$, $\omega_{24}$ and $\omega_{34}$ retained in the light source estimation parameter retaining unit 220, and performs the inner product calculation with the pixel data $x_0$ (four-dimensional vector) to calculate the inner product calculation result $y_0$. Six sets of the inner product calculation in a combination of "one-to-one" of all light sources are performed, and scalar values whose number is a six-fold of effective pixels in total are therefore output.

On the other hand, for example, in order to judge whether the light source is "image pickup (state Dh) under the light source Lh" or "image pickup state .(Dk) under the light sources other than the light source Lh" among the four types of light sources, the inner product calculation circuit reads $\omega_{10}$, $\omega_{20}$, $\omega_{30}$ and $\omega_{40}$ retained in the light source estimation parameter retaining unit 220, and performs the inner product calculation with the pixel data $x_0$ (four-dimensional vector) to calculate the inner product calculation result $y_0$ (scalar values). Four sets of the inner product calculation in a combination of "one-to-multiple" of all light sources are performed, and scalar values whose number is a four-fold of effective pixels in total are therefore output.

The judgment circuit 240 judges from the results of the inner product calculation calculated by the inner product calculation circuit 230 whether image pickup is performed under which light source.

For example, in order to judge whether the light source is "image pickup (state Dh) under the light source Lh" or "image pickup state (Dk) under the light source Lk" among the four types of light sources, it is checked whether each of six scalar values obtained by the inner product calculation circuit 230 satisfies the expressions (11) and (12). Parameters necessary for the expressions (11) and (12) are read from the light source estimation parameter retaining unit 220. In this manner, six judgment results are obtained for each pixel data, the results including: (1) one of D1 and D2 or indefinite, (2) one of D1 and D3 or indefinite, (3) one of D2 and D3 or indefinite, (4) one of D2 and D3 or indefinite, (5) one of D2 and D4 or indefinite, and (6) one of D3 and D4 or indefinite.

On the other hand, for example, in order to judge whether the light source is "image pickup (state Dh) under the light source Lh" or "image pickup state (Dk) under the light sources other than the light source Lh" among the four types of light sources, it is checked whether each of four scalar values obtained by the inner product calculation circuit 230 satisfies the expressions (11) and (12). Parameters necessary for the expressions (11) and (12) are read from the light source estimation parameter retaining unit 220. In this manner, four judgment results are obtained for each pixel data, the results including: (1) D1, one of the states other than D2, or indefinite, (2) D2, one of the states other than D22, or indefinite, (3) D3, one of the states other than D3, or indefinite, and (4) D4, one of the states other than D4, or indefinite.

The majority decision circuit 260 decides which state is large in number, in accordance with the judgment results obtained by the judgment circuit 240.

For example, in order to judge whether the light source is "image pickup (state Dh) under the light source Lh" or "image pickup state (Dk) under the light source Lk" among the four types of light sources:

(1) D1 and D2 are compared and if judgment is D1, a counter N12 is incremented by "1", whereas if judgment is D2, a counter N21 is incremented by "1";

(2) D1 and D3 are compared and if judgment is D1, a counter N13 is incremented by "1", whereas if judgment is D3, a counter N31 is incremented by "1";

(3) D1 and D4 are compared and if judgment is D1, a counter N14 is incremented by "1", whereas if judgment is D4, a counter N41 is incremented by "1";

(4) D2 and D3 are compared and if judgment is D2, a counter N23 is incremented by "1", whereas if judgment is D3, a counter N32 is incremented by "1";

(5) D2 and D4 are compared and if judgment is D2, a counter N24 is incremented by "1", whereas if judgment is D4, a counter N42 is incremented by "1", and (6) D3 and D4 are compared and if judgment is D3, a counter N34 is incremented by "1", whereas if judgment is D4, a counter N43 is incremented by "1".

Then, if "a certain h is Nhk>Nkh for all ks (k=1 to 4, however, excluding k=h), it means the result capable of estimating that "the light source Lh is always Lh through comparison with any other light source" so that it is judged that "Lh is the final light source". If there is no h satisfying this, (N12+N13+N14), (N21+N23+N24), (N31+N32+N34) and (N41+N42+N43) are calculated, and the first and second largest values are selected from four values. If "a difference between the first and second is equal to or larger than a predetermined value" and "the first largest is (N12+N13+N14)", it means that the number of pixels judged as "the light source is L1" is fairly large so that it is judged that "L1 is the final light source". If "a difference between the first and second is equal to or larger than the predetermined value" and "the first largest is (N21+N23+N24)", it means that the number of pixels judged as "the light source is L2" is fairly large so that it is judged that "L2 is the final light source". If "a difference between the first and second is equal to or larger than the predetermined value" and "the first largest is (N31+N32+N34)", it means that the number of pixels judged as "the light source is L3" is fairly large so that it is judged that "L3 is the final light source". If "a difference between the first and second is equal to or larger than the predetermined value", and "the first largest is (N41+N42+N43)", it means that the number of pixels judged as "the light source is L4" is fairly large so that it is judged that "L4 is the final light source". If a difference between the first and second is not equal to and not lager than the predetermined value, it means that the number of pixels judged as "the light source is La" and the number of pixels judged as "the light source is Lb", respectively for at least two different light sources (La and Lb), have only a small difference so that it is judged that present judgment failed, and the previous judgment retained in the previous result retaining unit 270 is used as the final light source.

On the other hand, for example, in order to judge whether the light source is "image pickup (state Dh) under the light source Lh" or "image pickup state (Dk) under the light sources other than the light source Lh" among the four types of light sources:

(1) D1 and the states other than D2 are compared and if judgment is D1, a counter N10 is incremented by "1";

(2) D2 and the states other than D2 are compared and if judgment is D2, a counter N20 is incremented by "1";

(3) D3 and the states other than D3 are compared and if judgment is D3, a counter N30 is incremented by "1 "; and (4) D4 and the states other than D4 are compared and if judgment is D4, a counter N40 is incremented by "1".

Then, the first and second largest values are selected from N10, N20, N30 and N40. If "a difference between the first and second is equal to or larger than a predetermined value" and "the first largest is N10", it means that the number of pixels judged as "the light source is L1" is fairly large so that it is judged that "L1 is the final light source". If "a difference between the first and second is equal to or larger than the predetermined value", and "the first largest is N20", it means that the number of pixels judged as "the light source is L2" is fairly large so that it is judged that "L2 is the final light source". If "a difference between the first and second is equal to or larger than the predetermined value" and "the first largest is N30", it means that the number of pixels judged as "the light source is L3" is fairly large so that it is judged that "L3 is the final light source". If "a difference between the first and second is equal to or larger than the predetermined value" and "the first largest is N40", it means that the number of pixels judged as "the light source is L4" is fairly large so that it is judged that "L4 is the final light source". If a difference between the first and second is not equal to and not lager than the predetermined value, it means that the number of pixels judged as "the light source is La" and the number of pixels judged as "the light source is Lb", respectively for at least two different light sources (La and Lb), have only a small difference so that it is judged that present judgment failed, and the previous judgment retained in the previous result retaining unit 270 is used as the final light source.

The previous result retaining unit 270 retains the previous result judged by the majority decision circuit 260. Here, the term "previous" means previous in terms of time. Image pickup is performed, for example, 30 times per second while input images are monitored, and the previous result in this case is the result of the input image before 1/30 second.

If the majority decision circuit 260 judges that judgment failed, the judgment result, i.e., the light source type, retained in the previous result retaining unit 270 is used. It may be considered that the initial state immediately after the power is turned on is set to, for example, "sun light" most often used.

The light source limiting unit 250 limits a target light source to be processed by the inner product calculation circuit 230 and the judgment circuit 240. The light limiting unit 250 is connected to the user interface 190 via the signal line 199 to limits the light source in accordance with a setting instruction from a user.

For example, in a case where light source setting switches are provided for light source estimation, limiting light sources to a specific type, the light sources are limited in accordance with the set contents to make the inner product calculation circuit 230 and judgment circuit 240 conduct the corresponding processing. Two illuminations of a fluorescent lamp and an LED have often similar outer perspectives so that it is difficult to judge whether illumination in the presently image pickup scene (particularly in a room) is by the fluorescent lamp or the LED. Even in this case, if a user makes judgment of "whether the presently image pickup scene is under LED or fluorescent lamp", light source judgment can be simplified.

If there is an electronic flash button for designating a presence/absence of an electronic flash operation, the type of light sources to be estimated can be changed with the presence/absence. If the presence/absence of the electronic flash operation is indefinite, it is necessary to consider nine types of light sources including: sun light, fluorescent lamp, incandescent lamp, LED, electronic flash, mixture light of electronic flash and sun light, mixture light of electronic flash and fluorescent lamp, mixture light of electronic flash and incandescent lamp, and mixture light of electronic flash and LED. If the presence/absence of the electronic flash operation is already known, the light sources to be considered can be limited as in the following. Namely, if the electronic flash operation is not conducted, four types of light sources are considered, including: sun light, fluorescent lamp, incandescent lamp, and LED. If the electronic flash operation is conducted, five types of light sources are considered, including: electronic flash, mixture light of electronic flash and sun light, mixture light of electronic flash and fluorescent lamp, mixture light of electronic flash and incandescent lamp, mixture light of electronic flash and LED.

In the above description, a light source is judged for each effective pixel in the whole screen and the judgment results are counted for majority decision. However, the present invention is not limited thereto. For example, an accuracy of an estimation result of each effective pixel may be obtained, and accuracies are cumulatively added to finally estimate a light source. Description will be made by using two examples.

For example, in order to judge from accuracies whether the light source is "image pickup (state Dh) under the light source Lh" or "image pickup state (Dk) under the light source Lk" among the four types of light sources, the judgment circuit 240 calculates $P(y_0|D1) \times P(D1) - P(y_0|D2) \times P(D2)$ for each of six scalar values obtained by the inner product calculation circuit. In this manner, accuracies of estimation results can be obtained, including:

(1) a degree of accuracy of an estimation result of "not the light source L2 but the light source L1";
(2) a degree of accuracy of an estimation result of "not the light source L3 but the light source L1";
(3) a degree of accuracy of an estimation result of "not the light source L4 but the light source L1";
(4) a degree of accuracy of an estimation result of "not the light source L3 but the light source L2";
(5) a degree of accuracy of an estimation result of "not the light source L4 but the light source L2"; and
(6) a degree of accuracy of an estimation result of "not the light source L4 but the light source L3".

In view of the result, it is ascribed that:
(1) for a pixels having a degree of accuracy of "0" or higher of the estimation result of "not the light source L2 but the light source L1", the value is cumulatively added to obtain N12', and for a pixel having a degree of accuracy lower than "0", the value is multiplied by "−1", and cumulatively added to obtain N21';
(2) for a pixel having a degree of accuracy of "0" or higher of the estimation result of "not the light source L3 but the light source L1", the value is cumulatively added to obtain N13', and for a pixel having a degree of accuracy lower than "0", the value is multiplied by "−1" and cumulatively added to obtain N31';
(3) for a pixel having a degree of accuracy of "0" or higher of the estimation result of "not the light source L4 but the light source L1", the value is cumulatively added to obtain N14', and for a pixel having a degree of accuracy lower than "0", the value is multiplied by "−1" and cumulatively added to obtain N41';
(4) for a pixel having a degree of accuracy of "0" or higher of the estimation result of "not the light source L3 but the light source L2", the value is cumulatively added to obtain N23', and for a pixel having a degree of accuracy lower than "0", the value is multiplied by "−1" and cumulatively added to obtain N32';
(5) for a pixel having a degree of accuracy of "0" or more of the estimation result of "not the light source L4 but the light source L2", the value is cumulatively added to obtain N24', and for a pixel having a degree of accuracy smaller than "0", the value is multiplied by "−1" and cumulatively added to obtain N42'; and
(6) for a pixel having a degree of accuracy of "0" or more of the estimation result of "not the light source L4 but the light source L3", the value is cumulatively added to obtain N34', and for a pixel having a degree of accuracy smaller than "0", the value is multiplied by "−1" and cumulatively added to obtain N43'.

Then, if "a certain h is Nhk'>Nkh' for all ks (k=1 to 4. However, excluding k=h), it means the result capable of estimating that "the light source Lh is always Lh through comparison with any other light source" so that it is judged that "Lh is the final light source". If there is no h satisfying this, (N12'+N13'+N14'), (N21'+N23'+N24'), (N31'+N32'+N34') and (N41'+N42'+N43') are calculated, and the first and second largest values are selected from four values. If "a difference between the first and second is equal to or larger than a predetermined value" and "the first largest is (N12'+N13'+N14')", it means that the number of pixels judged that "the light source is L1" is fairly large so that it is judged that "L1 is the final light source". If "a difference between the first and second is equal to or larger than the predetermined value" and "the first largest is (N21'+N23'+N24')", it means that the number of pixels judged that "the light source is L2" is fairly large so that it is judged that "L2 is the final light source". If "a difference between the first and second is equal to or larger than the predetermined value" and "the first largest is (N31'+N32'+N34')", it means that the number of pixels judged that "the light source is L3" is fairly large so that it is judged that L3 is the final light source". If "a difference between the first and second is equal to or larger than the predetermined value" and "the first largest is (N41'+N42'+N43')", it means that the number of pixels judged that "the light source is L4" is fairly large so that it is judged that "L4 is the final light source". If a difference between the first and second is not equal to and not larger than the predetermined value, it means that the number of pixels judged that "the light source is La" and the number of pixels judged that "the light source is Lb", respectively for at least two different light sources (La and Lb), have only a small difference so that it is judged that present judgment failed, and the previous judgment retained in the previous result retaining unit 270 is used as the final light source.

On the other hand, for example, in order to judge whether the light source is "image pickup (state Dh) under the light source Lh" or "image pickup state (Dk) under the light sources other than the light source Lh" among the four types of light sources, the judgment circuit 240 calculates $P(y_0|D1) \times P(D1) - P(y_0|D2) \times P(D2)$ for each of four scalar values obtained by the inner product calculation circuit 230. It is therefore possible to obtain:

(1) a degree of accuracy of an estimation result of "the light source L1";
(2) a degree of accuracy of an estimation result of "the light source L2";
(3) a degree of accuracy of an estimation result of "the light source L3"; and
(4) a degree of accuracy of an estimation result of "the light source L4".

In view of the above, it is ascertained that:
(1) degrees of accuracy of estimation results of "the light source L1" are cumulatively added to obtain N10';
(2) degrees of accuracy of estimation results of "the light source L2" are cumulatively added to obtain N20';
(3) degrees of accuracy of estimation results of "the light source L3" are cumulatively added to obtain N30'; and
(4) degrees of accuracy of estimation results of "the light source L4" are cumulatively added to obtain N40'.

Then, the first and second largest values are selected from N10', N20', N30' and N40', and following judgments are conducted. If "a difference between the first and second is equal to or larger than a predetermined value" and "the first largest is N10'", it means that the number of pixels judged as "the light source is L1" is fairly large so that it is judged that "L1 is the final light source". If "a difference between the first and second is equal to or larger than the predetermined value" and "the first largest is N20'", it means that the number of pixels judged as "the light source is L2" is fairly large so that it is judged that "L2 is the final light source". If "a difference between the first and second is equal to or larger than the predetermined value" and "the first largest is N30'", it means that the number of pixels judged as "the light source is L3" is fairly large so that it is judged that "L3 is the final light source". If "a difference between the first and second is equal to or larger than the predetermined value" and "the first largest is N40'", it means that the number of pixels judged as "the light source is L4" is fairly large so that it is judged that "L4 is the final light source". If a difference between the first and second is not equal to and not lager than the predetermined value, it means that the number of pixels judged as "the light source is La" and the number of pixels judged as "the light source is Lb", respectively for at least two different light sources (La and Lb), have only a small difference so that it is judged that present judgment failed, and the previous judgment retained in the previous result retaining unit 270 is used as the final light source.

FIGS. 7A and 7B are diagram showing examples of lookup tables retaining white balance gains and color correction matrices according to an embodiment of the present invention. The image processing parameter setting unit 300 supplies white balance gains and a color correction matrix corresponding to the light source estimated by the light source estimating circuit 200 to the white balance circuit 140 and the color reproduction processing circuit 150. In this case, the image processing parameter setting unit 300 reads parameters retained in a lookup table prepared inside or outside the image processing parameter setting unit at an address corresponding to the light source.

FIG. 7A is a lookup table of white balance gains. The lookup table retains white balance gains $g_r$, $g_g$ and $g_b$ of a set of RGB for each of the light sources L1 to L4. In accordance with the light source estimated by the light source estimating circuit 200, the image processing parameter setting unit 300 reads a corresponding set of white balance gains and supplies the gains to the white balance circuit 140 via the signal line 308.

The white balance gain is already known for each of some light sources including sun light, fluorescent lamp, incandescent lamp and the like, and can be used if the estimated light sources are sun light, fluorescent lamp, incandescent lamp and the like. In a case where the estimated light source is LED, it is assumed that the same white balance gain as that of sun light is used. Due to this arrangement, even if the light source is LED, similar processing to those of other light sources can be performed.

FIG. 7B is a lookup table for color correction matrices. The lookup table retains color correction matrices M11 to M33 each constituted of 3×3=9 elements for each of the light sources L1 to L4. In accordance with the light source estimated by the light source estimating circuit 200, the image processing parameter setting unit 300 reads a corresponding set of color correction matrices and supplies the matrices to the color reproduction processing circuit 150 via the signal line 309.

The color correction matrices are already known for each of some light sources including sun light, fluorescent lamp, incandescent lamp and the like, and can be used if the estimated light sources are sun light, fluorescent lamp, incandescent lamp and the like. In a case where the estimated light source is LED, a white balance table is prepared for LED in the following manner.

Consider now a method using a Macbeth chart. The Macbeth chart is color charts constituted of 24 colors. Each color chart has a spectral reflection factor of each of main components obtained by collecting spectral reflection factors of all objects in the world and performing main components analysis. Twenty colors of 24 colors are chromatic. If colors of a camera output when the Macbeth chart is picked up using a camera are equal to those viewed with human eyes, it can be presumed that correct white balance and color reproduction are realized. Assuming that the Macbeth chart is under LED illumination, the following expression is obtained from the expression (1):

$$\begin{bmatrix} R_{sensor j} \\ G_{sensor j} \\ B_{sensor j} \end{bmatrix} = \begin{bmatrix} \int E_4(\lambda) S_j(\lambda) R_R(\lambda) d\lambda \\ \int E_4(\lambda) S_j(\lambda) R_G(\lambda) d\lambda \\ \int E_4(\lambda) S_j(\lambda) R_B(\lambda) d\lambda \end{bmatrix} (j = 1 \sim 20)$$

The expression (13) can be obtained by multiplying the white balance gains and color correction matrices by the above expression. The color correction matrices are represented by M11' to M33' to emphasize that the matrices are for LED color correction matrices.

$$\begin{bmatrix} M'_{11} & M'_{12} & M'_{31} \\ M'_{21} & M'_{22} & M'_{32} \\ M'_{31} & M'_{32} & M'_{33} \end{bmatrix} \begin{bmatrix} g_r \times R_{sensor j} \\ g_g \times G_{sensor j} \\ g_b \times B_{sensor j} \end{bmatrix} = \begin{bmatrix} M'_{11} & M'_{12} & M'_{31} \\ M'_{21} & M'_{22} & M'_{32} \\ M'_{31} & M'_{32} & M'_{33} \end{bmatrix}$$

$$\begin{bmatrix} g_r \times \int E_4(\lambda) S_j(\lambda) R_R(\lambda) d\lambda \\ g_g \times \int E_4(\lambda) S_j(\lambda) R_G(\lambda) d\lambda \\ g_b \times \int E_4(\lambda) S_j(\lambda) R_B(\lambda) d\lambda \end{bmatrix}$$

$(j = 1 \sim 20)$

The expression (13) is theoretically coincident with the following expression (14) expressing an output of human eyes:

$$\begin{bmatrix} X_{human,j} \\ Y_{human,j} \\ Z_{human,j} \end{bmatrix} = \begin{bmatrix} \int E_4(\lambda)S_j(\lambda)x(\lambda)d\lambda \\ \int E_4(\lambda)S_j(\lambda)x(\lambda)d\lambda \\ \int E_4(\lambda)S_j(\lambda)x(\lambda)d\lambda \end{bmatrix} (j = 1 \sim 20)$$

It is therefore sufficient if 3×3 matrices each constituted of M11' to M11' elements satisfying "expression (13)=expression (14)" are obtained for all chromatic colors j (j=1 to 2) in the Macbeth charts. In the expressions (13) and (14), data other than M11' to M33' are already known. There are nine unknown numbers and observation data is twenty so that it is actually difficult to be "expression (13)=expression (14)" for all j (j=1 to 20). Therefore, M11' to M33' having a minimum "square of (expression (13)—expression (14))" are obtained. Namely, M11' to M33' are determined by the error least square. 3×3 matrices constituted of M11' to M33' elements obtained in this manner is stored in advance in the lookup table shown in FIG. 7B as a "color correction matrices for LED".

Figure 8:
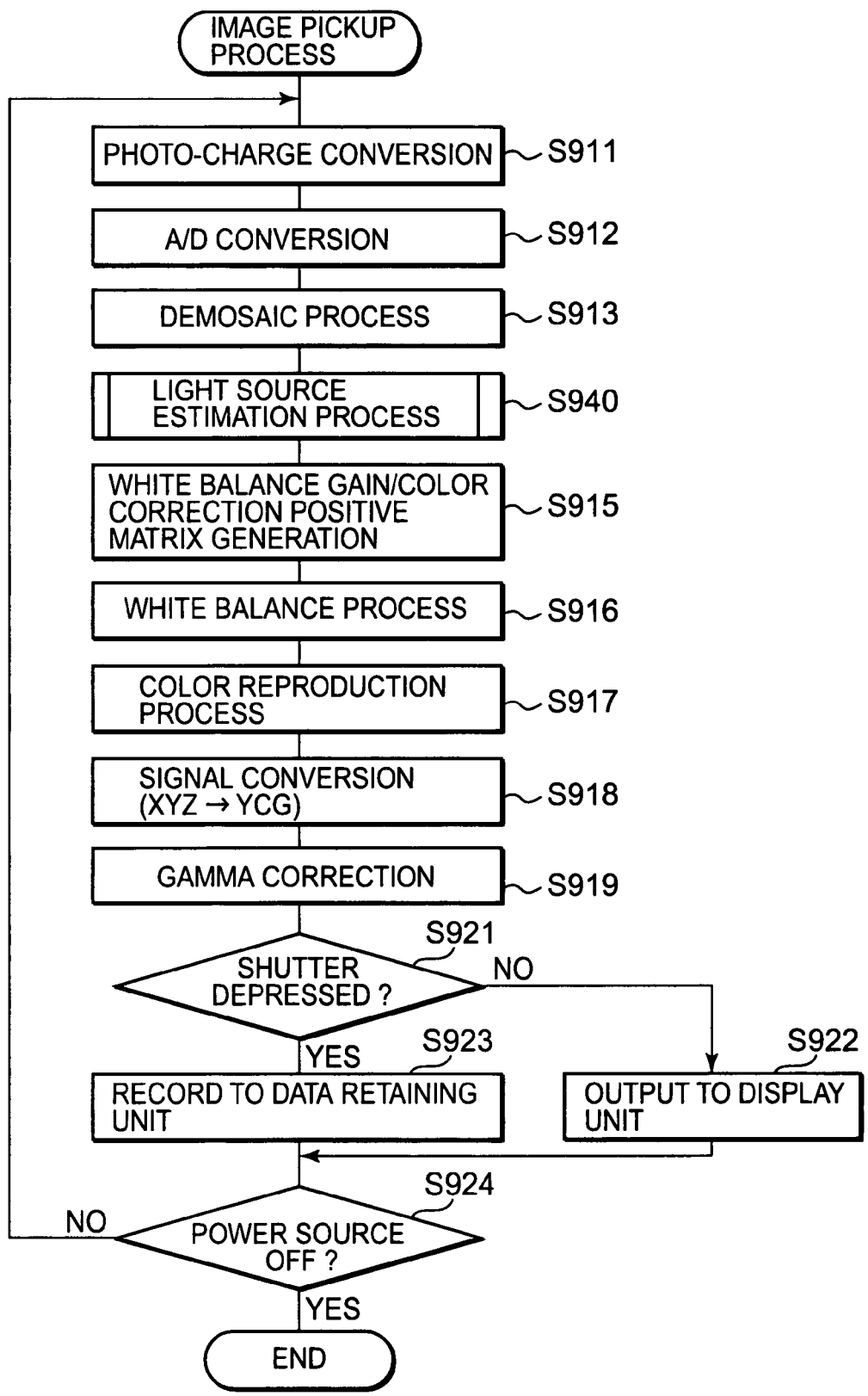
FIG. 8 is a diagram showing an example of a process sequence of the image pickup apparatus according to the embodiment of the present invention.

FIG. 8 is a diagram showing an example of a process sequence of the image pickup apparatus 100 according to the embodiment of the present invention. As a power is turned on, light received by the image pickup device 110 via a lens (not shown) is fetched as an input image.

The input image is photoelectrically converted into an electric signal (voltage value) by the image pickup device 110 and is output (Step S911). This electric signal is converted from an analog signal into a digital signal by the A/D converter circuit 120 (Step S912). The digital signal is subjected to a demosaic process by the demosaic block 130 (Step S913). An RGBE signal is therefore supplied to the light source estimating circuit 200 and an RGB signal is supplied to the white balance circuit 140.

In accordance with the RGBE signal, the light source estimating circuit 200 estimates the light source used when the input image was picked up (Step S940). The type of the light source estimated by the light source estimation process is supplied to the image processing parameter setting unit 300.

In accordance with the type of the estimated light source, the image processing parameter setting unit 300 reads white balance gains and color correction matrices as image processing parameters from the lookup tables (Step S915). The white balance gains are supplied to the white balance circuit 140 and the color correction matrices are supplied to the color reproduction processing circuit 150.

The white balance circuit 140 performs a white balance process by multiplying the RGB pixel data supplied from the demosaic block 130 by the corresponding ones of the white balance gains supplied from the image processing parameter setting unit 300 (Step S916). The color reproduction processing circuit 150 performs a color reproduction process by multiplying the RGB pixel data subjected to the white balance process by the white balance circuit 140 by the color correction matrices supplied from the image processing parameter setting unit 300 (Step S917). With this color reproduction process, pixel data constitutes one point in the XYZ space.

The signal conversion processing circuit 160 converts the XYZ space into a YCC format (Step S918). The gamma correction circuit 170 performs a gamma correction process in accordance with gamma values of the display unit 181 and the like (Step S919).

The input image subjected to these processes is output as a monitor image on the display unit 181 while the shutter button on the user interface 190 is not depressed (Step S922). If the shutter button is depressed, the input image at that time is recorded in the data retaining unit 182 as image data (Step S923). These processes are repeated until the power is turned off (Step S924).

Figure 9:
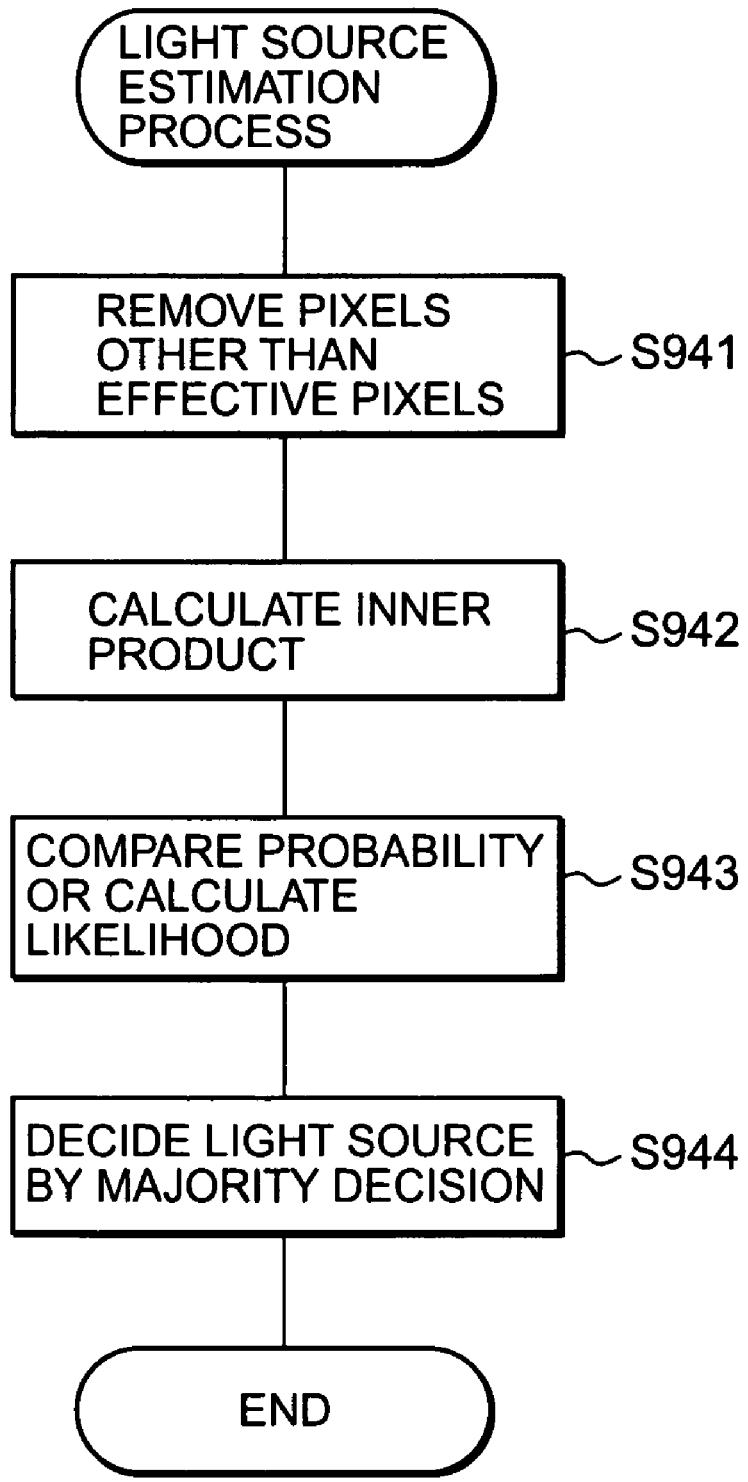
FIG. 9 is a diagram showing an example of a process sequence of light source estimation processes.

FIG. 9 is a diagram showing an example of the process sequence of the light source estimation process (Step S940) according to an embodiment of the present invention.

Among the RGBE signals supplied from the demosaic block 130, extreme values near zero or near a maximum value are removed by the effective pixel selection circuit 210 (Step S941). The inner product calculation circuit 230 performs an inner product calculation of the expression (8) (Step S942). Coordinate values of pixel data of the input image projected on the axis ω can therefore be obtained.

In accordance with the coordinate values projected on the axis ω, the judgment circuit 240 judges whether the values correspond to the expression (11) or (12) (Step S943). If the values correspond to the expression (11), the state is D1, whereas if the values correspond to the expression (12), the state is D2. If the values correspond to none of the expressions, judgment failed.

In accordance with the judgment result, the majority decision circuit 260 makes a majority decision for effective pixels in the whole input image to thereby finally estimate the light source (Step S944).

As described earlier, degrees of accuracy of the states of the coordinate values projected on the axis ω may be calculated at step S943, and the degrees of accuracy are cumulatively added.

As described above, according to the embodiments of the present invention, the inner product calculation circuit 230 projects pixel data of an input image on the one-dimensional axis so that the light source under which the input image was picked up can be estimated by the judgment circuit 240.

The embodiments of the present invention are only illustrative examples for reducing the invention in practice. As described in the following, there are correspondence between the embodiments and the specific matters of the invention recited in claims. The invention is not limited to the correspondence, but various modifications are possible without departing from the gist of the present invention.

Namely, the distribution retaining means corresponds, e.g., to the light source estimation parameter retaining unit 220. The coordinate determining means corresponds, e.g., to the inner product calculation circuit 230. The distribution judging means corresponds, e.g., to the judging circuit 240.

The majority decision means corresponds, e.g., to the majority decision circuit 260.

The image pickup means correspond, e.g., to the image pickup device 110. The distribution retaining means corresponds, e.g., to the light source estimation parameter retaining unit 220. The coordinate determining means corresponds, e.g., to the inner product calculation circuit 230. The distribution judging means corresponds, e.g., to the judging circuit 240. The white balance processing means corresponds, e.g., to the white balance circuit 140. The color reproduction processing means corresponds, e.g., to the color reproduction processing circuit 150.

The light source limiting means corresponds, e.g., to the light source limiting unit 250.

The electronic flash light emission detecting means corresponds, e.g., to the user interface 190.

The distribution retaining means corresponds, e.g., to the light source estimation parameter retaining unit 220. The step of determining the coordinates of the pixel data of an input image in the predetermined space corresponds, e.g., to Step S942. the step of judging whether the coordinates belong to which distribution of the pixel data picked up under the first or second light source corresponds, e.g., to step S943.

The process sequence described in the embodiments of the present invention may be considered as a method having a series of these steps, a program for making a computer execute a series of these steps, or a storage medium for storing the program.

According to the present invention, excellent advantages can be obtained realizing high precision light source estimation and supplying proper parameters of a white balance process and a color reproduction process.

It should be understood by those skilled in the art that various modifications, combinations, sub-combinations and alterations may occur depending on design requirements and other factors insofar as they are within the scope of the appended claims or the equivalents thereof.

CROSS REFERENCES TO RELATED APPLICATIONS

The present document contains subject matter related to Japanese Patent Application JP 2006-124720 filed in the Japanese Patent Office on Apr. 28, 2006, the entire contents of which being incorporated herein by reference.

What is claimed is:

1. A light source estimating apparatus for estimating a type of a light source used when an input image is picked up, the apparatus comprising:
   a pixel selection circuit means for selecting effective pixel data, the pixel selection circuit selecting pixels not having the pixel data of zero or near zero and selecting pixels not having the pixel data of a maximum value or near the maximum value;
   distribution retaining means which retains a distribution, in a predetermined space, of the selected effective pixel data picked up under a first or second light source and stores parameters for light source estimation;
   coordinate determining means which determines coordinates of the selected effective pixel data of the input image in the predetermined space and performs a calculation between the selected effective pixel data picked up under the first or second light source and the parameters stored in the distribution retaining means; and
   distribution judging means which judges distribution of the selected effective pixel data picked up under the first or second light source to which the coordinates belong,
   wherein an estimation result by the light source estimating apparatus is supplied to an image parameter setting means, the image parameter setting means supplying white balance gains and a color correction matrix corresponding to the estimated light source to a white balance processing means and a color reproduction processing means.

2. The light source estimating apparatus according to claim 1, wherein:
   the space is a one-dimensional space; and
   the distribution is a distribution obtained by projecting the pixel data on the one-dimensional space.

3. The light source estimating apparatus according to claim 1, further comprising:
   majority decision means which estimates a light source through majority decision of judgment results on which distribution of the pixel data picked up under the first or second light source the coordinates of a plurality of pixel data of the input image belong to.

4. The light source estimating apparatus according to claim 1, wherein the first light source includes an LED.

5. The light source estimating apparatus according to claim 1, wherein:
   the first light source is any one of a plurality of types of light sources; and
   the second light source is one of the plurality of types of light sources other than the first light source.

6. The light source estimating apparatus according to claim 5, wherein the plurality of types of light sources include an LED.

7. The light source estimating apparatus according to claim 1, wherein:
   the first light source is one of four types of light sources including sun light, a fluorescent lamp, an incandescent lamp, and an LED; and
   the second light source is one of the four types of light sources other than the first light source.

8. The light source estimating apparatus according to claim 1, wherein:
   the first light source is one of a plurality of types of light sources; and
   the second light source is one of the plurality of types of light sources other than the first light source of the plurality of types of light sources.

9. The light source estimating apparatus according to claim 8, wherein the plurality of types of light sources include an LED.

10. The light source estimating apparatus according to claim 8, wherein:
    the first light source is one of four types of light sources including sun light, a fluorescent lamp, an incandescent lamp, and an LED; and
    the second light source is one of the four types of said plurality of types of light sources other than the first light source.

11. An image pickup apparatus, comprising:
    image pickup means which picks up an input image;
    a light source estimating circuit means for estimating a light source, comprising:
    a pixel selection circuit means for selecting effective pixel data, the pixel selection circuit selecting pixels not having the pixel data of zero or near zero and selecting pixels not having the pixel data of a maximum value or near the maximum value,
    distribution retaining means which retains a distribution, in a predetermined space, of the selected effective pixel data picked up under a first or second light source and stores parameters for light source estimation,
    coordinate determining means which determines coordinates of the selected effective pixel data of the input image in the predetermined space and performs a calculation between the selected effective pixel data picked up under the first or second light source and the parameters stored in the distribution retaining means, and
    distribution judging means which judges distribution of the selected effective pixel data picked up under the first or second light source to which the coordinates belong;
    white balance processing means which performs a white balance process of the input image in accordance with a judgment result;

color reproduction processing means which performs a color reproduction process of an output of the white balance process in accordance with the judgment result; and parameter setting means which supplies white balance gains and a color correction matrix corresponding to the light source estimated by the light source estimating circuit means to the white balance processing means and the color reproduction processing means.

12. The image pickup apparatus according to claim 11, further comprising:
light source limiting means which limits the first light source to a specific type of a light source and making the distribution judging means conduct the judgment.

13. The image pickup apparatus according to claim 12, further comprising:
electronic flash emission light detecting means which detects whether electronic flash light emission was effected when the input image was picked up, wherein:
the light source limiting means makes the distribution judging means conduct the judgment, in accordance with a detection result of the electronic flash light emission.

14. The image pickup apparatus according to claim 11, wherein:
the first light source is one of a plurality of types of light sources; and
the second light source is one of the plurality of types of light sources other than the first light source.

15. The image pickup apparatus according to claim 14, further comprising:
light source limiting means which limits the plurality of types of light sources to a specific type of a light source and making the distribution judging means conduct the judgment.

16. The image pickup apparatus according to claim 15, wherein:
the light source limiting means limits the plurality of types of light sources to a fluorescent lamp and makes the distribution judging means conduct the judgment.

17. The image pickup apparatus according to claim 11, wherein:
the white balance processing means utilizes white balance gains of sun light in a case where the judgment results indicates that the light source is an LED.

18. A light source estimating method for a light source estimating apparatus provided with pixel selection circuit means which selects effective pixel data, the pixel selection circuit selecting pixels not having the pixel data of zero or near zero and selecting pixels not having the pixel data of a maximum value or near the maximum value, and distribution retaining means which retains a distribution, in a predetermined space, of the selected effective pixel data picked up under a first or second light source, estimates a type of a light source used when an input image is picked up, and stores parameters for light source estimation, the method comprising steps of:
determining coordinates in the space of the selected effective pixel data of the input image;
performing a calculation between the selected effective pixel data picked up under the first or second light source and the parameters stored in the distribution retaining means; and
judging distribution of the selected effective pixel data picked up in the first or second light source to which the coordinates belong,
wherein an estimation result by the light source estimating apparatus is supplied to an image parameter setting means, the image parameter setting means supplying white balance gains and a color correction matrix corresponding to the estimated light source to a white balance processing means and a color reproduction processing means.

19. A computer program product tangibly embodied in a computer-readable storage medium for a light source estimating apparatus provided with pixel selection circuit means which selects effective pixel data, the pixel selection circuit selecting pixels not having the pixel data of zero or near zero and selecting pixels not having the pixel data of a maximum value or near the maximum value, and distribution retaining means which retains a distribution, in a predetermined space, of the selected effective pixel data picked up under a first or second light source, estimates a type of a light source used when an input image is picked up, and stores parameters for light source estimation, the computer program product comprising instructions operable to cause a data processing apparatus to perform the following steps:
determining coordinates in the space of the selected effective pixel data of the input image;
performing a calculation between the selected effective pixel data picked up under the first or second light source and the parameters stored in the distribution retaining means; and
judging distribution of said selected effective pixel data picked up in said first or second light source to which the coordinates belong,
wherein an estimation result by the light source estimating apparatus is supplied to an image parameter setting means, the image parameter setting means supplying white balance gains and a color correction matrix corresponding to the estimated light source to a white balance processing means and a color reproduction processing means.

20. A light source estimating apparatus for estimating a type of a light source used when an input image is picked up, the apparatus comprising:
a pixel selection section which selects effective pixel data, the pixel selection circuit selecting pixels not having the pixel data of zero or near zero and selecting pixels not having the pixel data of a maximum value or near the maximum value;
a distribution retaining section which retains a distribution, in a predetermined space, of the selected effective pixel data picked up under a first or second light source and stores parameters for light source estimation;
a coordinate determining section which determines coordinates of the selected effective pixel data of the input image in the predetermined space and performs a calculation between the selected effective pixel data picked up under the first or second light source and the parameters stored in the distribution retaining section; and
a distribution judging section which judges distribution of the selected effective pixel data picked up under the first or second light source to which the coordinates belong,
wherein an estimation result by the light source estimating apparatus is supplied to an image parameter setting section, the image parameter setting section supplying white balance gains and a color correction matrix corresponding to the estimated light source to a white balance processing section and a color reproduction processing section.

* * * * *